(12) United States Patent
Yoshinaka et al.

(10) Patent No.: US 8,270,265 B2
(45) Date of Patent: Sep. 18, 2012

(54) OPTICAL PICKUP DEVICE AND OPTICAL DISK DEVICE

(75) Inventors: Hideki Yoshinaka, Fukuoka (JP); Masaharu Fukakusa, Miyazaki (JP); Mayumi Tsukamoto, Nagasaki (JP); Satoshi Nagata, Fukuoka (JP); Eizo Ono, Kumamoto (JP)

(73) Assignee: Panasonic Corporation, Osaka (JP)

( * ) Notice: Subject to any disclaimer, the term of this patent is extended or adjusted under 35 U.S.C. 154(b) by 1039 days.

(21) Appl. No.: 12/187,167

(22) Filed: Aug. 6, 2008

(65) Prior Publication Data
US 2009/0040893 A1    Feb. 12, 2009

(30) Foreign Application Priority Data
Aug. 7, 2007  (JP) ................. 2007-205290

(51) Int. Cl.
*G11B 7/00* (2006.01)
(52) U.S. Cl. .................................. 369/44.23
(58) Field of Classification Search .......... None
See application file for complete search history.

(56) References Cited

U.S. PATENT DOCUMENTS

| | | | |
|---|---|---|---|
| 4,870,632 A | 9/1989 | Shiono et al. | |
| 5,475,670 A | 12/1995 | Hamada et al. | |
| 6,084,842 A * | 7/2000 | Miura | 369/112.19 |
| 7,301,882 B2 | 11/2007 | Itonaga | |
| 7,315,503 B2 | 1/2008 | Cho et al. | |
| 7,738,347 B2 * | 6/2010 | Tsukamoto et al. | 369/112.23 |
| 7,872,952 B2 * | 1/2011 | Kurozuka et al. | 369/44.23 |
| 7,889,620 B2 * | 2/2011 | Fukakusa et al. | 369/112.19 |
| 2006/0171263 A1 | 8/2006 | Cho et al. | |
| 2008/0062827 A1 | 3/2008 | Tsukamoto | |
| 2009/0040893 A1 | 2/2009 | Yoshinaka et al. | |

FOREIGN PATENT DOCUMENTS

| | | |
|---|---|---|
| JP | 63-228428 | 9/1988 |
| JP | 63-249101 | 10/1988 |
| JP | 2008-90990 A | 4/2008 |

* cited by examiner

*Primary Examiner* — Joseph Feild
*Assistant Examiner* — Parul Gupta
(74) *Attorney, Agent, or Firm* — Panasonic Patent Center; Dhiren Odedra; Kerry Culpepper

(57) ABSTRACT

An optical pickup device or an optical disk device includes: a light source 11 that emits a laser beam toward an optical disk 25; an optical receiver 18 that detects light reflected from the optical disk 25; and an astigmatism-generating element 31 that generates light used for focus control in a condition where a focusing position on one of two perpendicular cross sections including an optical axis of the light reflected from the optical disk 25 is located ahead of the optical receiver 18 and a focusing position on the other cross section is located behind the optical receiver 18. The astigmatism-generating element 31 is a Fresnel mirror 31a configured to include a plurality of reflecting mirrors, and an imaginary surface 31d that connects the tips of the reflecting mirrors is curved in a concave shape toward a light incidence side.

3 Claims, 15 Drawing Sheets

OPTICAL DISK IS NEAR

OPTICAL DISK IS FAR

OPTICAL PICKUP DEVICE AND OPTICAL DISK DEVICE

BACKGROUND

1. Technical Field

The technical field relates to an optical pickup device and an optical disk device mounted in an electronic apparatus, such as a personal computer or a notebook computer.

2. Description of the Related Art

As electronic apparatuses, such as personal computers and notebook computers, have become smaller, optical pickup devices and optical disk devices mounted therein have also become smaller.

FIG. 13 is a view illustrating the configuration of main parts in an optical system of a known optical pickup device. A light source 101 emits a laser beam for a Digital Versatile Disk or Digital Video Disk (hereafter: "DVD") having a wavelength λ1 of about 650 nm and a laser beam for a compact disk (hereafter: "CD") having a wavelength λ2 of about 780 nm toward an optical disk 104. A prism 102 is formed of optical glass, for example, and has a slope where a beam splitter 103 is formed inside the prism 102. The beam splitter 103 is formed by using a polarization separating film and has a property of transmitting a laser beam, which is emitted from the light source 101 and moves toward the optical disk 104, and of reflecting a laser beam reflected from the optical disk 104. The optical disk 104 is a DVD or a CD. The detection lens 105 is an astigmatism-generating element. Since the detection lens 105 has a shape of a so-called columnar lens or cylindrical lens, focal distances on two perpendicular cross sections including an optical axis are different. An optical receiver 106 has a light-detecting portion 107 which detects light reflected from the optical disk 104.

Light emitted from the light source 101 is transmitted through the beam splitter 103 and is then incident on the optical disk 104. Light reflected from the optical disk 104 is reflected by the beam splitter 103, is incident on the detection lens 105, and is then incident on the optical receiver 106.

FIG. 14A is an explanatory view illustrating a known detection lens, FIG. 14B is a view illustrating a state of a spot when an optical disk is near, and FIG. 14C is a view illustrating a state of a spot when an optical disk is far. Referring to FIG. 14A, light 108 transmitted through the detection lens 105 forms a focal point in the neighborhood of the optical receiver 106. A focal point 109 of the light 108 on a cross section in the vertical direction is positioned ahead of the optical receiver 106, and a focal point 110 of the light 108 on a cross section in the horizontal direction is positioned behind the optical receiver 106. That is, the optical receiver 106 is disposed between the two focal points 109 and 110. The shape of a spot 111 on the optical receiver 106 is almost circular.

As shown in FIG. 14B, in the case where the optical disk 104 is close to an optical pickup device, the spot 111 of a laser beam in the optical receiver 106 becomes long in the horizontal direction. On the other hand, as shown in FIG. 14C, in the case where the optical disk 104 is far from the optical pickup device, the spot 111 has a long shape in the vertical direction. A focus control signal can be obtained by disposing the A to D light-detecting portions 107 in a cross shape and calculating a focus error signal FES=(A+C)−(B+D). That is, since the focus error signal FES>0 in the case where the optical disk 104 is near and the focus error signal FES<0 in the case where the optical disk 104 is far, the position of the optical disk 104 can be checked.

SUMMARY

JP-A-63-249101 describes an optical pickup device which is small in size and is high in precision and in which a detection lens as a Fresnel lens is united with an optical receiver, even though an example of only one wavelength is shown. FIG. 15A is a cross-sectional view illustrating a normal lens, and FIG. 15B is a cross-sectional view illustrating a Fresnel lens. A Fresnel lens 113 is a lens obtained by dividing a normal lens 112 for every predetermined height d and moving each of the divided parts in order to make the entire lens thin. A depth d of a level difference 113a of the Fresnel lens 113 is equivalent to the predetermined height d by which the lens 112 is divided. In addition, a region where a refraction operation is actually performed is an orbicular band shaped lens portion which is called a ring band 113a. The astigmatism-generating element has been explained as a lens but may also be a mirror.

A level difference of the Fresnel lens or Fresnel mirror as an astigmatism-generating element is preferably made to match a wavelength used so that diffraction does not occur. However, light beams having two different wavelengths of light for DVD and light for CD are incident on the astigmatism-generating element. Accordingly, at least one of the light for DVD and the light for CD causes diffraction. There is a case where diffracted light appears as stray light on the optical receiver and is incident on a light-detecting portion other than original light-detecting portions. This was one of the causes that make tracking control or focus control unstable.

In view of the above problems, as well as other concerns, an optical pickup device and an optical disk device are provided which are small and capable of realizing stabilized tracking control and focus control.

The optical pickup device includes: a light source that emits a laser beam toward an optical disk; an optical receiver that detects light reflected from the optical disk; and an astigmatism-generating element that generates light used for focus control in a condition that a focusing position on one of two perpendicular cross sections including an optical axis of the light reflected from the optical disk is located ahead of the optical receiver and a focusing position on the other cross section is located behind the optical receiver. The astigmatism-generating element is a Fresnel mirror configured to have a plurality of orbicular band shaped reflecting mirrors, and an imaginary surface which connects the tips of the orbicular band shaped reflecting mirrors is curved in a concave shape toward a light incidence side.

DETAILED DESCRIPTION (First Embodiment)

Figure 1:
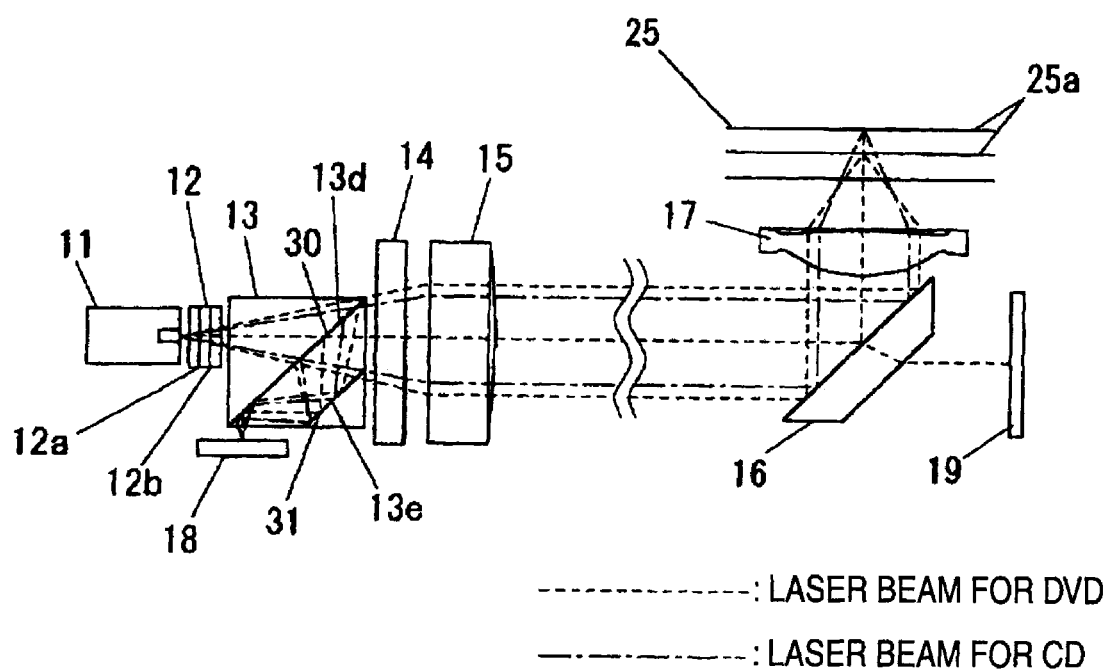
FIG. 1 is a view illustrating the configuration of an optical system of an optical pickup device according to a first embodiment.

A first embodiment will be described with reference to the accompanying drawings. FIG. 1 is a view illustrating the configuration of an optical system of an optical pickup device according to a first embodiment.

A light source 11 emits a laser beam for a DVD having a wavelength $\lambda 1$ of about 650 nm and a laser beam for a CD having a wavelength $\lambda 2$ of about 780 nm toward an optical disk 25 from adjacent positions. A distance between emission positions of laser beams having two wavelengths is about 110 μm. In the first embodiment, the emission position of the laser beam with the wavelength $\lambda 1$ and the emission position of the laser beam with the wavelength $\lambda 2$ are arranged to align almost in parallel on a surface of the optical disk 25. In addition, a laser beam emitted may be used in combination with a laser beam having a wavelength $\lambda 3$ of about 405 nm which is used in a Blu-ray Disc or HD-DVD.

A diffraction element 12 has a first diffraction grating 12a and a second diffraction grating 12b, and the first diffraction grating 12a and the second diffraction grating 12b are disposed in series. The first diffraction grating 12a diffracts the laser beam with the wavelength $\lambda 1$ into zero-order light or ±1-order light and makes the laser beam with the wavelength $\lambda 2$ transmitted therethrough. The second diffraction grating 12b diffracts the laser beam with the wavelength $\lambda 2$ into zero-order light or ±1-order light and makes the laser beam with the wavelength $\lambda 1$ transmitted therethrough. The light that has been diffracted into zero-order light or ±1-order light by the diffraction element 12 is incident on an optical receiver 18 and is used for a tracking control of the optical pickup device.

An integrated prism 13 has slopes 13d and 13e, which are parallel to each other, thereinside. A beam splitter 30 is formed on the slope 13d. In the first embodiment, the beam splitter 30 makes laser beams emitted from the light source 11, which are forward light beams and have wavelengths $\lambda 1$ and $\lambda 2$, transmitted toward the optical disk 25 and makes laser beams reflected from the optical disk 25, which are returning light beams and have the wavelengths $\lambda 1$ and $\lambda 2$, reflected toward the optical receiver 18. The beam splitter 30 is formed of a polarization separating film of a dielectric multilayer.

An astigmatism-generating element 31 is formed on the slope 13e. The astigmatism-generating element 31 is an optical element in which focusing positions on two perpendicular cross sections including an optical axis of light passing through the astigmatism-generating element 31 are different from each other. The optical receiver 18 is disposed such that the focusing position of emitted light on one cross section is located ahead of the optical receiver 18 and the focusing position of reflected light on the other cross section is located behind the optical receiver 18. The light transmitted through the astigmatism-generating element 31 is incident on the optical receiver 18 and is used for focus control of the optical pickup device. By using a Fresnel mirror 31a configured to have a plurality of reflecting mirrors, the astigmatism-generating element 31 is formed. As discussed more fully later, the reflecting mirrors can be orbicular band or curve shaped.

A wavelength plate 14 converts the direction of polarization. The wavelength plate 14 converts a forward laser beam emitted from the light source 11, which is linearly polarized light, into circularly polarized light and converts a returning laser beam reflected from the optical disk 25, which is circularly polarized light, into linearly polarized light shifted by 90° from the forward laser beam. By changing the phase of linearly polarized light by means of a function of the wavelength plate 14, the beam splitter 30 can make the forward laser beam transmitted and the returning laser beam reflected.

A collimating lens 15 converts forward light, which is diverging light, into approximately parallel light and converts returning light, which is parallel light, into converging light.

A rising mirror 16 is a reflecting mirror that changes the direction such that the forward light almost parallel to a surface of the optical disk 25 forms almost a right angle with respect to the surface of the optical disk 25. A polarization separating film is formed on the surface of the rising mirror 16, such that a part of forward light is transmitted to move toward a second optical receiver 19.

An objective lens 17 is a lens that makes conversion such that forward laser beams, which are parallel beams, converge on a recording surface 25a of the optical disk 25.

The optical receiver 18 detects a laser beam that is emitted from the light source 11 and is reflected from the optical disk 25. The optical receiver 18 converts light detected in a light-detecting portion into an electric signal and outputs the converted signal. The output signal is used for focus control, tracking control, and reproduction of information recorded on the recording surface 25a of the optical disk 25, for example.

The second optical receiver 19 detects a laser beam that is emitted from the light source 11 and is not incident on the optical disk 25. A signal output from the second optical receiver 19 is used to control the output of a laser beam emitted from the light source 11.

The optical disk 25 is a DVD or a CD, for example. In the case when the light source 11 that emits a laser beam with a wavelength λ3 is used, the optical disk may also be a Blu-ray Disc or an HD-DVD.

A laser beam emitted from the light source 11 is diffracted into zero-order light or ±1-order light by the diffraction element 12, is transmitted through the beam splitter 30 of the integrated prism 13, and is incident on the wavelength plate 14. The laser beam is converted from linearly polarized light into circularly polarized light by the wavelength plate 14, is converted from diverging light into parallel light by the collimating lens 15, is reflected by the rising mirror 16 to convert the propagating direction, and is incident on the objective lens 17. A part of light is transmitted to be incident on the second optical receiver 19. The laser beam is converted into converging light by the objective lens 17 and is then condensed onto the recording surface 25a of the optical disk 25.

The laser beam reflected from the recording surface 25a of the optical disk 25 is converted from diverging light into parallel light by the objective lens 17, and the direction of the laser beam is converted by the rising mirror 16. Then, the laser beam is converted from parallel light into converging light by the collimating lens 15 and is incident on the wavelength plate 14. The light is converted into linearly polarized light having a phase different from the forward light by the wavelength plate 14, is reflected from the beam splitter 30 of the integrated prism 13, and is incident on the astigmatism-generating element 31. The laser beam is reflected in a state where the astigmatism used for focus control is reflected by the astigmatism-generating element 31 and is then incident on the optical receiver 18.

Figure 2:
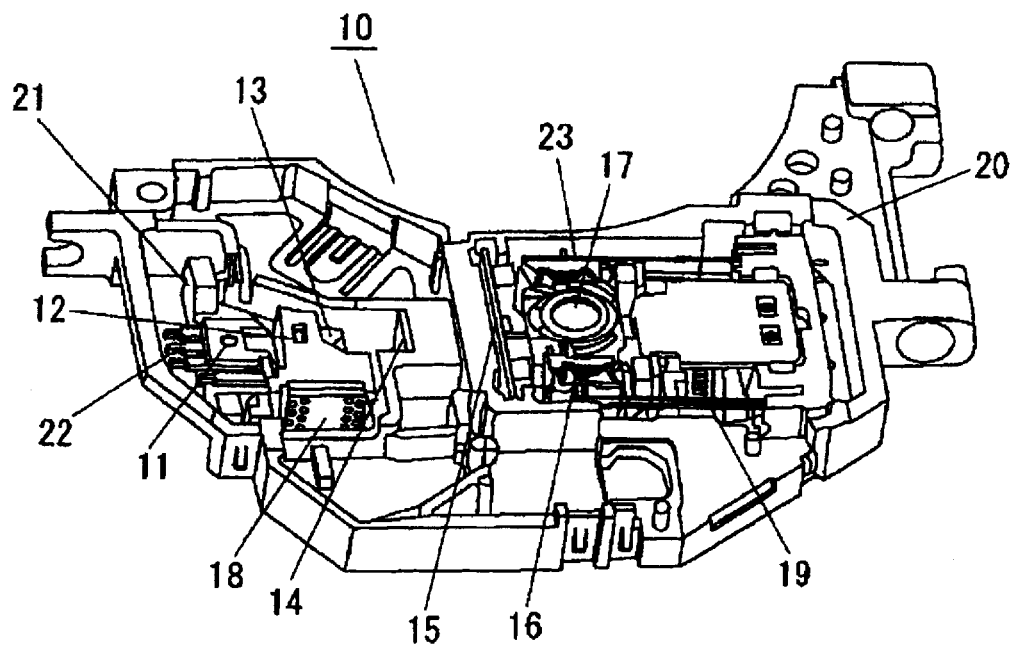
FIG. 2 is a view illustrating the configuration of an optical pickup device from which a cover in the first embodiment is removed.

FIG. 2 is a view illustrating the configuration of an optical pickup device from which a cover in the first embodiment is removed. An optical pickup device 10 is configured to include various components disposed on a pedestal 20. The pedestal 20 is a skeleton of the optical pickup device 10. The pedestal 20 is formed of an alloy material, such as a Zn alloy or an Mg alloy, or a hard resin material. Preferably, the pedestal 20 is formed of an alloy material that is easy to secure the rigidity. An attaching portion for disposing various components is provided at a predetermined place of the pedestal 20.

The light source 11, the diffraction element 12, the integrated prism 13, and the optical receiver 18 are fixed to a bonding member 21 to thereby form a laser module 22, and the bonding member 21 is fixed to the pedestal 20. The objective lens 17 is mounted in an actuator 23 that drives the objective lens 17, and the actuator 23 is fixed to the pedestal 20. The wavelength plate 14, the collimating lens 15, the rising mirror 16, and the second optical receiver 19 are fixed to the pedestal 20 directly or through another attaching member.

Figure 3A:
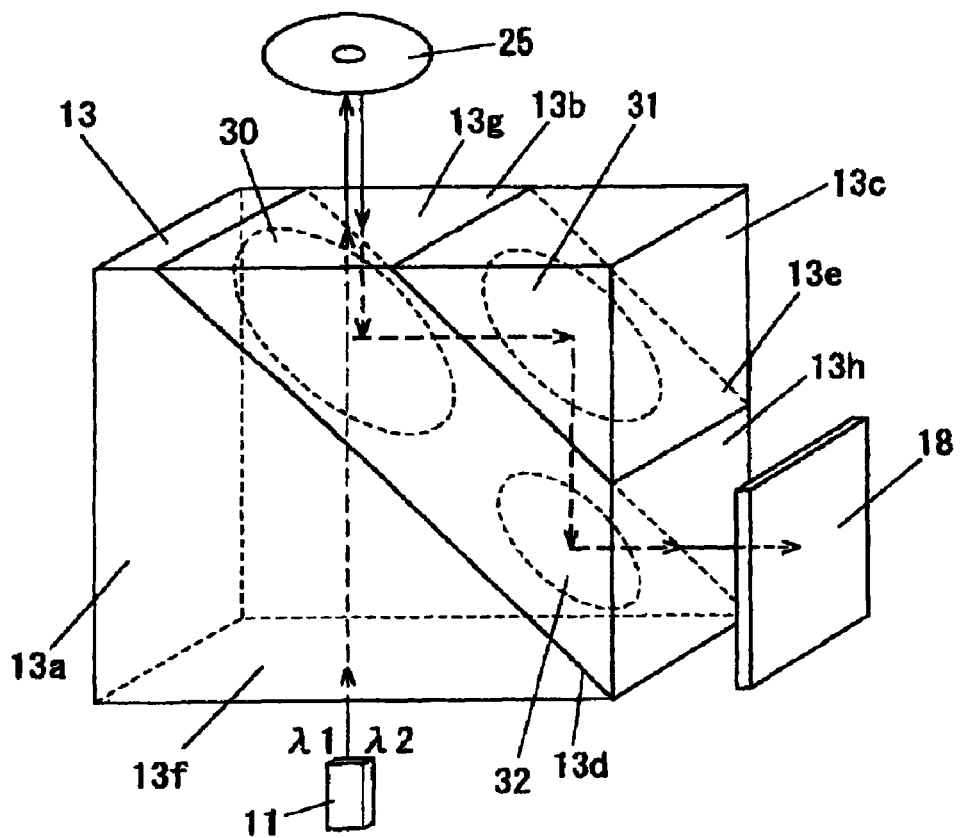
FIG. 3A is a view illustrating the configuration of an optical system related to an astigmatism-generating element in the first embodiment.
Figure 3B:
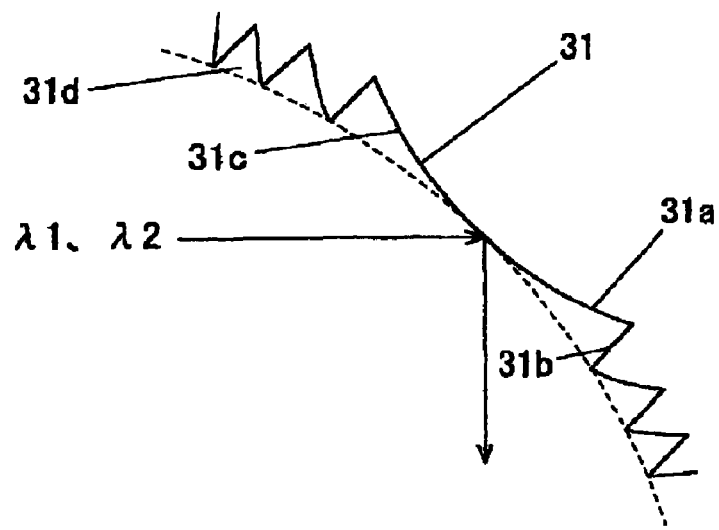
FIG. 3B is a view illustrating the shape of the astigmatism-generating element in the first embodiment.

FIG. 3A is a view illustrating the configuration of an optical system related to the astigmatism-generating element in the first embodiment, and FIG. 3B is a view illustrating the shape of the astigmatism-generating element in the first embodiment. The integrated prism 13 can include three blocks 13a, 13b, and 13c. A bonding surface between the blocks 13a and 13b is the slope 13d and a bonding surface between the blocks 13b and 13c is the slope 13e. The blocks 13a, 13b, and 13c are formed of optical glass, such as BK7. The blocks 13a, 13b, and 13c may also be formed of optical plastics. A reflecting film 32 is formed on the slope 13d in addition to the beam splitter 30. The reflecting film 32 is formed of a metallic film or a dielectric multilayer. The reflecting film 32 may also be a film common with the beam splitter 30. In addition, the slopes 13d and 13e are parallel and are inclined by about 45° with respect to side surfaces 13f, 13g, and 13h through which laser beams having the wavelengths λ1 and λ2 are emitted from or incident on the integrated prism 13.

The laser beam incident on the side surface 13f of the integrated prism 13 from the light source 11 is transmitted through the slope 13d, is emitted from the side surface 13g, and is incident on the optical disk 25. At this time, the laser beam is transmitted at an input/output angle of about 45° with respect to the beam splitter 30. The laser beam reflected from the optical disk 25 is incident on the side surface 13g, is reflected from the slope 13d, is reflected from the slope 13e, is further reflected from the slope 13d, is emitted from the side surface 13h, and is then incident on the optical receiver 18. At this time, the laser beam is reflected at an input/output angle of about 45° with respect to the beam splitter 30. In addition, the laser beam is also reflected at an input/output angle of about 45° with respect to the Fresnel mirror 31a that is the astigmatism-generating element 31.

The Fresnel mirror 31a is a reflecting mirror configured to include a plurality of reflecting mirrors in order to make a curved mirror compact. The reflecting mirror can be, for example, orbicular band shaped or curved shaped, and will be referred to here as a ring band 31c. A level difference occurring on the boundary between the ring bands 31c adjacent to each other is simply called a level difference 31b. The level difference 31b can be equal to a multiple of the wavelength of the reflected light, preferably 1.5 times the wavelength. Tip portions of the ring bands 31c are offset from each other in a concave shaped pattern toward a light incidence side. That is, an imaginary surface d that connects the tips of the ring bands 31c is curved in a concave shape toward a light incidence side. This curving is very slightly made such that light at the end, among light incident on the Fresnel mirror 31a, is incident earlier than light in a central portion by wavelength order.

Since the imaginary surface 31d is curved in the concave shape toward the light incidence side, incident light is incident on the Fresnel mirror 31a earlier at the outer periphery compared with a case where the imaginary surface 31d has a completely flat shape. Accordingly, since a state of the phase of the level difference 31b changes and a component of diffracted light caused by the level difference 31b is reduced, stray light on the optical receiver 18 can be suppressed. As a result, the tracking control or the focus control is stabilized. In addition, since the Fresnel mirror 31a is used as the astigmatism-generating element 31, miniaturization can be realized. Accordingly, miniaturization and stabilized recording and reproduction are possible.

Figure 4A:
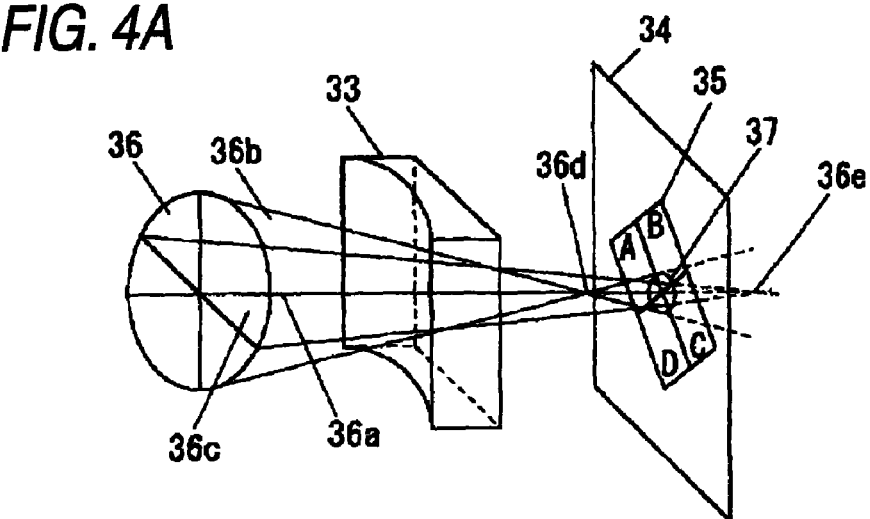
FIG. 4A is an explanatory view illustrating an astigmatism-generating element.
Figure 4B:
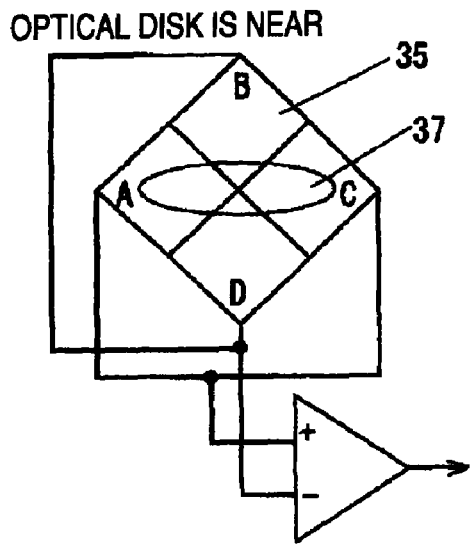
FIG. 4B is a view illustrating the shape of a spot when an optical disk is near.
Figure 4C:
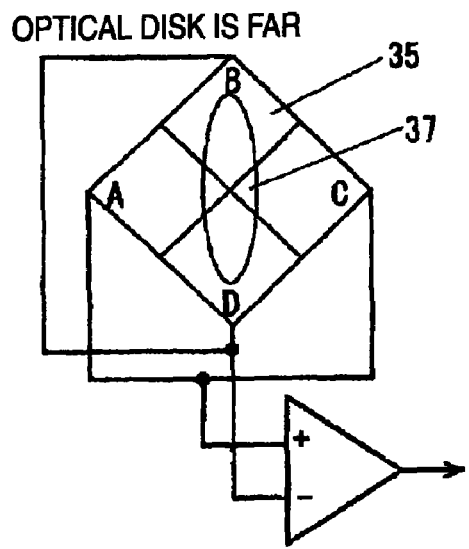
FIG. 4C is a view illustrating the shape of a spot when an optical disk is far.

FIG. 4A is an explanatory view illustrating an astigmatism-generating element, FIG. 4B is a view illustrating the shape of a spot when an optical disk is near, and FIG. 4C is a view illustrating the shape of a spot when an optical disk is far. The astigmatism-generating element 33 is an optical element in which focal distances on two perpendicular cross sections 36b and 36c including an optical axis 36a are different from each other. Examples of the astigmatism-generating element 33 include a so-called columnar lens, cylindrical lens, or a combination thereof and a cylindrical reflecting mirror, a columnar reflecting mirror, or a combination thereof. In FIG. 4A, the astigmatism-generating element 33 is shown as being formed as a cylindrical lens for simplicity.

The laser beam reflected from the optical disk 25 is converted into light converging on the light source 11 by the collimating lens 15 and returns. However, since the light is separated from the forward light so as to move toward the optical receiver 18 by the beam splitter 30, the laser beam incident on the astigmatism-generating element 31 is converging light. Laser beams condense near the optical receiver 18. Accordingly, a laser beam 36 that is incident on the astigmatism-generating element 33 is also converging light and is treated as light condensing near the optical receiver 34.

In FIG. 4A, the laser beam 36 on the cross section 36b in the vertical direction including the optical axis 36a is transmitted through the astigmatism-generating element 33 and converges on a focal point 36d. On the other hand, the laser beam 36 on the cross section 36c in the horizontal direction including the optical axis 36a tends to converge on a focal point 36e that is disposed farther behind the focal point 36d, since the astigmatism-generating element 33 functions as a concave lens. The optical receiver 34 is disposed between the focal point 36d and the focal point 36e. That is, the optical receiver 34 is disposed such that the focal point 36d is positioned ahead of the optical receiver 34 and the focal point 36e is positioned behind the optical receiver 34. That is, the laser beam 36 in the direction of the cross section 36b first converges on the focal point 36d and is then incident on the optical receiver 34 in a slightly spread state. The laser beam 36 in the direction of the cross section 36c is incident on the optical receiver 34 in a slightly spread state before converging on the focal point 36e. As a result, a spot 37 on the optical receiver 34 has an almost circular shape in a slightly spread state.

Referring to FIGS. 4B-4C, in the optical receiver 34, A to D light-detecting portions 35 which receive the laser beams 36 with the wavelengths λ1 and λ2 reflected from the optical disk 25 are disposed in a cross shape. The A and C light-detecting portions 35 are disposed in the left and right direction, and the B and D light-detecting portions 35 are disposed in the up and down direction. The A to D light-detecting portions 35 convert the received light into an electric signal. An electric signal converted by the A light-detecting portion 35, an electric signal converted by the B light-detecting portion 35, an electric signal converted by the C light-detecting portion 35, and an electric signal converted by the D light-detecting portion 35 are assumed to be A, B, C, and D, respectively. The focus error signal FES, which is a focus control signal, can be obtained by calculating FES=(A+C)−(B+D).

In the case where the optical disk 25 is close to an optical pickup device as shown in FIG. 4B, the focal points 36d and 36e are distant from the optical disk 25. Accordingly, the focal point 36d becomes close to the optical receiver 34 and the focal point 36e becomes distant from the optical receiver 34. For this reason, the dimension of the spot 37 in the vertical direction becomes short and the dimension of the spot 37 in the horizontal direction becomes long. Accordingly, the focus error signal FES becomes larger than 0. In contrast, in the case where the optical disk 25 is far from the optical pickup device 10 as shown in FIG. 4C, the focal points 36d and 36e are close to the optical disk 25. Accordingly, the focal point 36d becomes distant from the optical receiver 34 and the focal point 36e becomes close to the optical receiver 34. For this reason, the dimension of the spot 37 in the vertical direction becomes long and the dimension of the spot 37 in the horizontal direction becomes short. Accordingly, the focus error signal FES becomes larger than 0. Thus, the focus error signal FES is a focus control signal indicating the positional deviation of the optical disk 25 in the focusing direction. The focus control is performed such that the focus error signal FES becomes 0 or a predetermined value.

Figure 5:
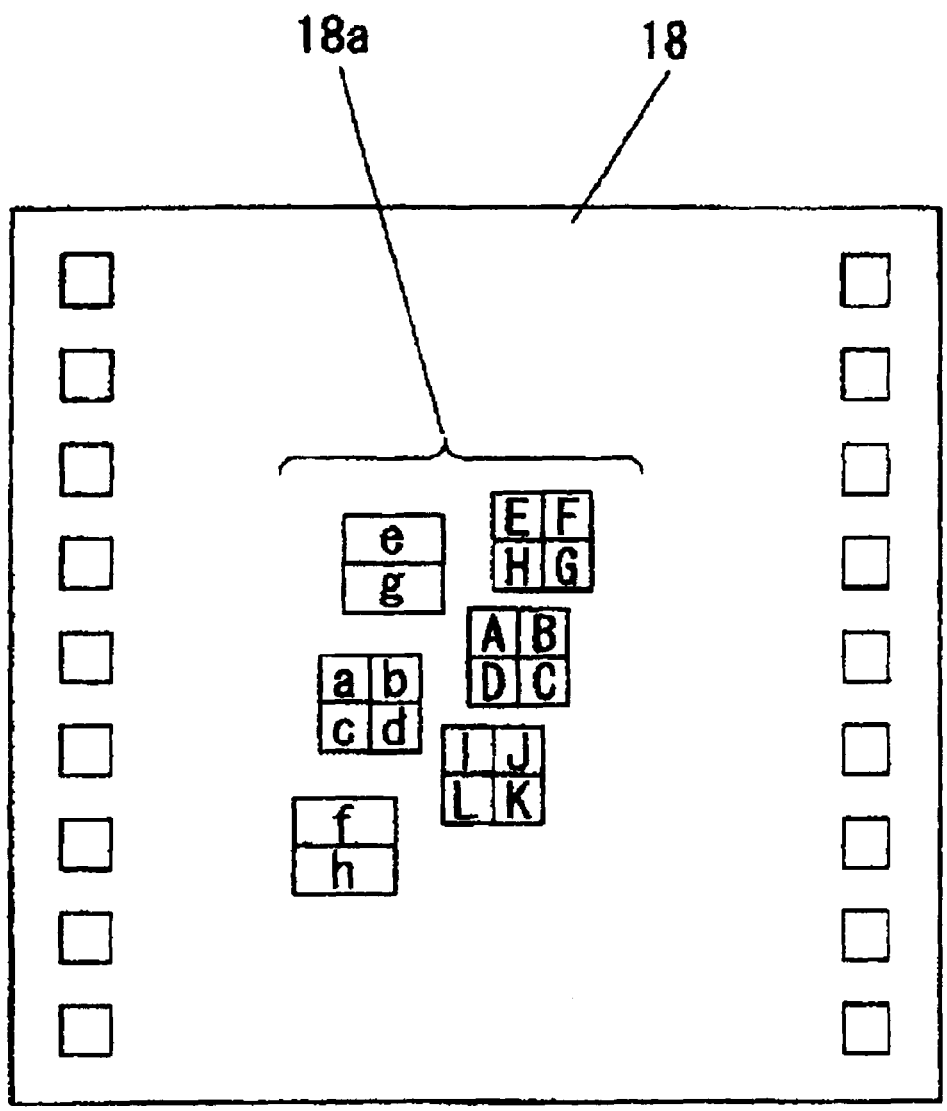
FIG. 5 is a view illustrating the layout of a light-detecting portion in an optical receiver in the first embodiment.

FIG. 5 is a view illustrating the layout of a light-detecting portion in an optical receiver in the first embodiment. The optical receiver 18 has light-detecting portions 18a of A to L and a to h. A laser beam for an optical disk associated with light having the first wavelength λ1 such as, for example, the DVD, is incident on the light-detecting portions 18a of A to L.

A laser beam for an optical disk associated with light having the second wavelength λ2 is such as, for example, the CD, is incident on the light-detecting portions 18a of a to h. Zero-order light generated by the first diffraction grating 12a is incident on the light-detecting portions 18a of A to D, and one of ±1-order laser beams is incident on the light-detecting portions 18a of E to G and I to L. In addition, zero-order light generated by the second diffraction grating 12b is incident on the light-detecting portions 18a of a to d, and one of ±1-order laser beams is incident on the light-detecting portions 18a of e and g and f and h. The light-detecting portions 18a of A to D and the light-detecting portions 18a of a to d in FIG. 5 correspond to the light-detecting portions 35 of A to D in FIG. 4.

In the first embodiment, the astigmatism-generating element 31 is rotated by 45° in the direction perpendicular to the optical axis 36a with respect to the astigmatism-generating element 33. Accordingly, the light-detecting portion 18a of the optical receiver 18 is rotated by 45° within a surface of the light-detecting portion 35 of the optical receiver 34. As a result, since the boundary of the light-detecting portions 18a of A to D within the optical receiver 18 become vertical and horizontal, it becomes easy to design the arrangement of the light-detecting portions 18a including the other light-detecting portions 18a.

In the optical receiver 18, electric signals for DVD that are incident on the light-detecting portions 18a of A, B, C, D, E, F, G, H, I, J, K, and L and are converted are assumed to be A, B, C, D, E, F, G, H, I, J, K, and L, respectively. Electric signals for CD that are incident on the light-detecting portions 18a of a, b, c, d, e, f, g, and h and are converted are assumed to be a, b, c, d, e, f, g, and h, respectively.

The focus error signal FES for DVD is FES=(A+C)−(B+D) in the case of DVD-ROM and DVD±R/RW and FES={(A+C)−(B+D)}+Kt×{(E+I+G+K)−(H+L+F+J)} in the case of DVD-RAM. Here, Kt is a constant determined according to operation setting. The focus error signal FES is a signal indicating focus deviation of a spot.

The focus error signal FES for CD is FES=(a+c)−(b+d) in the case of CD-R/RW/ROM.

A tracking error signal TES for DVD is TES=ph(A, D)−ph(B, C) in the case of DVD-ROM and TES={(A+B)−(C+D)}−Kt×{(E+I+F+J)−(G+K+H+L)} in the case of DVD+R/RW and DVD-RAM. Here, ph(X, Y) is a voltage obtained by converting a phase difference between X and Y detected. The tracking error signal TES is a signal indicating track position deviation of a spot.

The tracking error signal TES for CD is TES={(A+B)−(C+D)}−Kt×{(e+f)−(g+h)} in the case of CD-R/RW/ROM and TES=ph(a, d)−ph(b, c) in the case of CD-ROM. Usually, the former method capable of performing a tracking control more stably is used. However, for example, in the case of reproducing a poor disk in which the height of a pit of a CD-ROM does not comply with the standards, the tracking error signal TES may not be output satisfactorily in the former method. In such a case, the latter method can be used as a preparatory tracking control method since the tracking error signal TES can be output satisfactorily. Thus, since a tracking control can also be made in the case of reproducing a poor disk which does not comply with the standards so as not to make a tracking control, it is possible to meet the optical disk 25 in a broader range as an optical disk device.

Moreover, in FIG. 5, the arrangement of the light-detecting portions 18a of E to H, A to D, and I to L and the light-detecting portions 18a of e and g, a to d, and f and h are made to be slightly shifted from each other in the vertical direction of the drawing. This is because when zero-order light converges on a track of the recording surface 25a of the optical disk 25, ±1-order light converges in a state where the ±1-order light is shifted from the track. Accordingly, in the case when the zero-order light and the ±1-order light converge on the same track, the light-detecting portions 18a of E to H, A to D, and I to L and the light-detecting portions 18a of e and g, a to d, and f and h are arrayed in the vertical direction of the drawing.

Figure 6A:
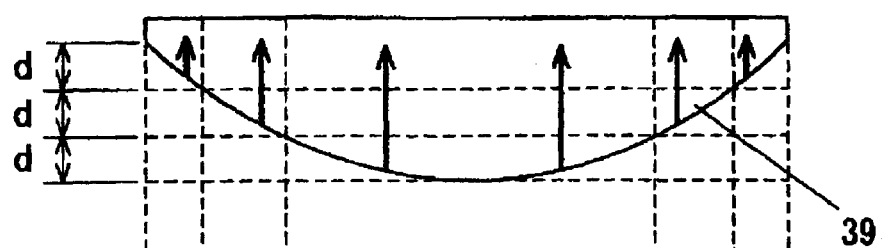
FIG. 6A is a view illustrating a curved mirror before being formed as a Fresnel mirror.
Figure 6B:
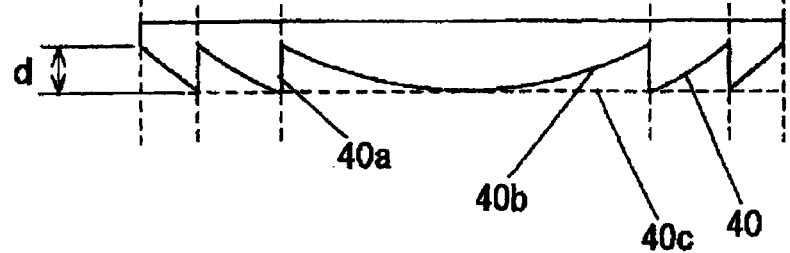
FIG. 6B is a view illustrating a Fresnel mirror.
Figure 7:
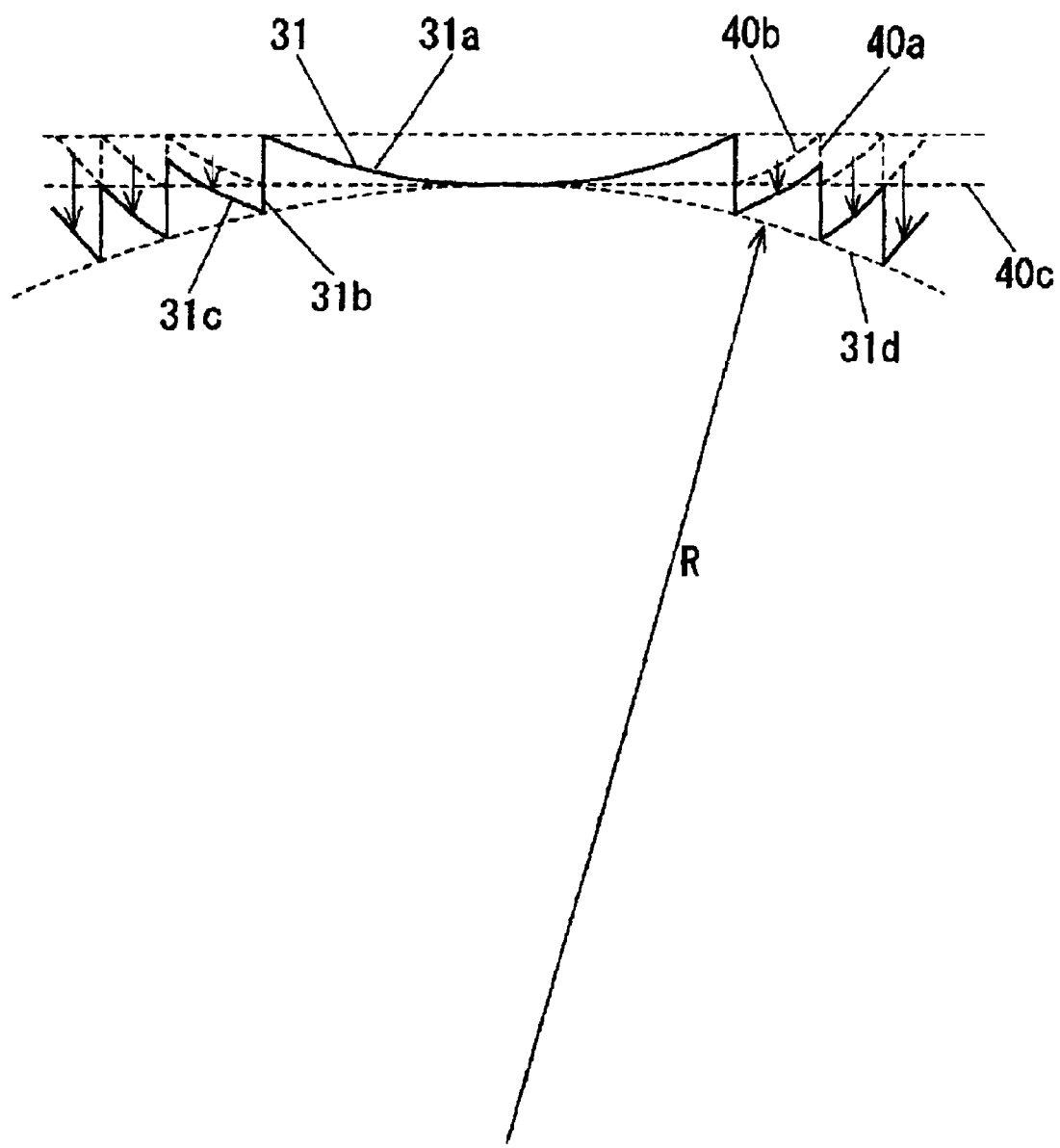
FIG. 7 is a view illustrating a shape of the Fresnel mirror in the first embodiment.

FIG. 6A is a view illustrating a curved mirror before being formed as a Fresnel mirror, FIG. 6B is a view illustrating a Fresnel mirror, and FIG. 7 is a view illustrating the shape of the Fresnel mirror in the first embodiment. A Fresnel mirror 40 is a reflecting mirror obtained by dividing a normal three-dimensional curved mirror 39 into a plurality of orbicular band shaped reflecting mirrors for every predetermined height d and moving each of divided ring bands 40b in order to make the entire reflecting mirror thin. A depth d of a level difference 40a of the Fresnel mirror 40 is equivalent to the predetermined height d by which the curved mirror 39 is divided. An imaginary surface 40c that connects the tips of the ring bands 40b is an almost flat surface.

The Fresnel mirror 31a in the astigmatism-generating element 31 is formed such that the imaginary surface 40c in the Fresnel mirror 40 has a concave shape toward the light incidence side. The shape of each ring band 40b is set as the shape of the ring band 31c, and the level difference 31b is formed to be deeper as the position gets closer to the outer periphery. Since the level difference 31b becomes deeper as it gets closer to the outer periphery, a stray light component generated at the position near the outer periphery of the Fresnel mirror 31a can be reduced. As a result, spreading of the stray light on the optical receiver 18 can be suppressed. In addition, the shape of the ring band 31c is the same as a case where the imaginary surface 31d is a completely flat shape. That is, the depth of each ring band 31c is equal to the predetermined height d. Therefore, the original performance of the Fresnel mirror 31 a can be maintained.

In the first embodiment, the shape of the Fresnel mirror 31a is derived in two steps where the shape of the Fresnel mirror 40 is derived from the shape of a normal three-dimensional curved mirror 39 and then the shape of the Fresnel mirror 31a is derived. However, the shape of the Fresnel mirror 31a is not limited to that described above but may also be derived by making the level difference 31b as deep as the outer periphery from the shape of the curved mirror 39.

In the first embodiment, the imaginary surface 31d is made to have a concave shape curved in the spherical surface shape. In the case of the spherical surface shape, the state of a phase of incident light changes largely at much as the outer periphery. Accordingly, it becomes easy to make a component of diffracted light small. However, the imaginary surface 31d does not need to have the spherical surface shape but may have a prolate spheroid shape or a cylindrical shape. In addition, the imaginary surface 31d may have a conical shape.

It is preferable that the radius R of the spherical surface of the imaginary surface 31d be 300 mm or more and 500 mm or less. Since an effect curved in the concave shape can be easily obtained as the radius R decreases, the diffracted light can be reduced. However, when the radius R is too small, the depth of the whole Fresnel mirror 31a becomes large. Accordingly, the shape of the ring band 31c or the precision of the level difference 31b deteriorates. In addition, since the Fresnel mirror 31a is manufactured by exposing, developing, or etching a photosensitive resin for lithography as will be described later, it takes much time for manufacturing if the depth of the whole Fresnel mirror 31a is large. If the radius R is 300 mm or more and 500 mm or less, the diffracted light can be sufficiently reduced, the shape of the ring band 31c and the precision of the level difference 31b can be sufficiently secured, and the manufacturing time can be shortened. In the first embodiment, the radius R of the spherical surface is set to 400 mm. However, the effect using the concave shape is slightly obtained even if the radius R is 600 mm or less and the effect using the concave shape allowing deterioration of the shape of the ring band 31c or precision of the level difference 31b is obtained even if the radius R is 200 mm or more. Accordingly, the Fresnel mirror 31a can also be used in the cases.

Preferably, the depth of the level difference 31b in the first embodiment is set to a depth almost equal to (natural number/2) times one wavelength of laser beams incident on the Fresnel mirror 31a. Since phases of light beams when the depth of the level difference 31b is set to approximately (natural number/2) times of the wavelength match each other, diffracted light is reduced. For the other light beams, by making the imaginary surface 31d curved in the concave shape toward the light incidence side, the diffracted light can be reduced.

The depth of the level difference 31b and the wavelength of a laser beam have the following relationship. Laser beams which are incident on the neighborhood of the boundary of the adjacent ring bands 31c and are reflected exactly cancel each other to make a diffracted light component zero, assuming that a difference between the optical path length of a laser beam, which is incident on a reflecting surface on a front side and is then reflected, and the optical path length of a laser beam, which is incident on a reflecting surface on a back side and is then reflected, is natural number multiples of a wavelength. That is, it is preferable that twice the depth of the level difference 31b corresponding to a return portion be natural number multiples of the wavelength. Here, "(natural number/2) times the wavelength of a laser beam" includes effects of a refractive index and an incident angle. Accordingly, assuming that the wavelength of a laser beam is $\lambda$, the refractive index is n, the incident angle is $\theta i$, and the natural number is m, the preferable depth d of the level difference 31b is $d=(m/2)\cdot\lambda/(\cos(\theta i)\cdot n)$. For example, assuming that the wavelength of a laser beam is $\lambda=\lambda 2=780$ nm, the refractive index as a refractive index of BK7 is n=1.51, the incident angle $\theta i$ is 45°, and m is 1, d is 365 nm.

In the first embodiment, the level difference 31b in the middle of the Fresnel mirror 31a is set to a depth almost equal to a half wavelength of reflected light from a CD. Since a phase of the reflected light from the CD matches that in the level difference 31b, diffracted light is small. For reflected light from a DVD, by causing the imaginary surface 31d to be curved in the concave shape toward the light incidence side, the diffracted light can be reduced. Therefore, satisfactory recording and reproduction can be performed on a DVD and a CD. In addition, the natural number is 1, the depth of the level difference 31b is small, and the depth of the whole Fresnel mirror 31a is also small. Accordingly, the manufacturing time can be shortened while sufficiently securing the shape of the ring band 31c and the precision of the level difference 31b.

Figure 8A:
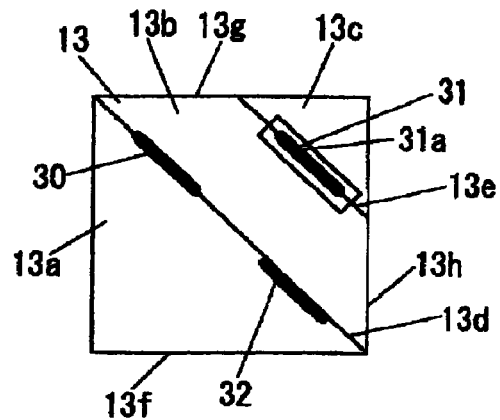
FIG. 8A is a view illustrating the configuration of an integrated prism in the first embodiment.
Figure 8B:
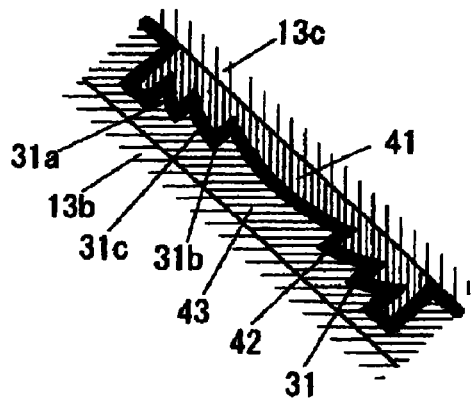
FIG. 8B is a view illustrating a first example of the configuration of the astigmatism-generating element in the first embodiment.
Figure 8D:
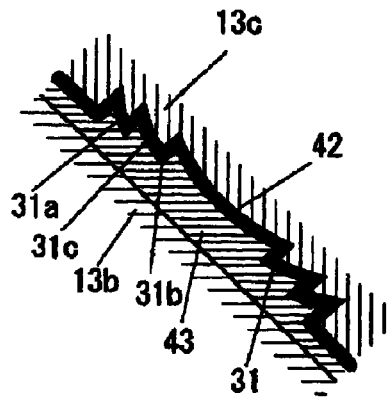
FIG. 8D is a view illustrating a third example of the configuration of the astigmatism-generating element in the first embodiment.
Figure 8C:
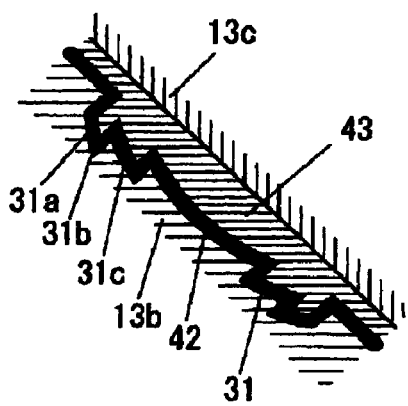
FIG. 8C is a view illustrating a second example of the configuration of the astigmatism-generating element in the first embodiment.
Figure 8E:
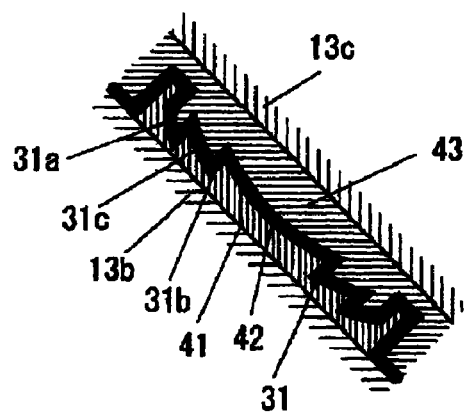
FIG. 8E is a view illustrating a fourth example of the configuration of the astigmatism-generating element in the first embodiment.

FIG. 8A is a view illustrating the configuration of the integrated prism in the first embodiment, FIG. 8B is a view illustrating a first example of the configuration of the astigmatism-generating element in the first embodiment, FIG. 8C is a view illustrating a second example of the configuration of the astigmatism-generating element in the first embodiment, FIG. 8D is a view illustrating a third example of the configuration of the astigmatism-generating element in the first embodiment, and FIG. 8E is a view illustrating a fourth example of the configuration of the astigmatism-generating element in the first embodiment.

In order to manufacture the astigmatism-generating element 31 in the first embodiment, it is desirable to use a gray scale mask allowing exposure in a predetermined shape. The gray scale mask is a mask whose transmittance with respect to light having a wavelength used for exposure changes continuously with a location in a portion equivalent to the ring band 31c. By using the gray scale mask, the depth of the level difference 31b and the curved shape of the continuous shape of the ring bands 31c, which is the original shape of the Fresnel mirror 31a, can be realized with high precision. In addition, the shape in which the imaginary surface 31d that connects the tips of the ring bands 31c is curved in a concave shape toward the light incidence side can also be realized. By using the gray scale mask, the stepwise shape is not almost observed in the ring bands 31c but the ring bands 31c become smooth. Accordingly, the satisfactory spot shape can be obtained on the optical receiver 18 that receives a laser beam. In addition, since one exposure is enough without repeating exposure multiple times, the surface shape of the Fresnel mirror 31a that is very close to a designed shape can be obtained. In contrast, it is difficult to realize the shape of the imaginary surface 31d in a method of repeating the exposure multiple times.

A method of manufacturing the astigmatism-generating element 31 shown in FIG. 8B is as follows. First, a resin 41 is coated on a surface of a plate-shaped block 13c and is then cured. The resin 41 is a photosensitive resin for lithography and is a photoresist or a photosensitive polyimide, for example. Then, an irregular pattern having a predetermined shape is left in the resin 41 by performing development by irradiation of ultraviolet rays and exposure through the gray scale mask by which a predetermined irregular pattern of the ring band 31c and the level difference 31b can be formed. This irregular pattern becomes a reflecting surface shape of the Fresnel mirror 31a. Then, an absorption film is formed and then a reflecting film 42 is formed on the surface. The surface shapes of the absorption film and reflecting film 42 are almost similar to the shape of the resin 41. The absorption film is a dielectric multilayer and the reflecting film 42 is a metallic film or a dielectric multilayer. Finally, the block 13b and the block 13c are bonded to each other with an adhesive 43. The adhesive 43 is an ultraviolet curable adhesive, a heat curable adhesive, or an anaerobic adhesive, for example. Preferably, the adhesive 43 is transparent for laser beams with the wavelengths $\lambda 1$ and $\lambda 2$ and has almost the same refractive index as a material used to form the block 13b.

Furthermore, a method of manufacturing the integrated prism 13 shown in FIG. 8A is as follows. The beam splitter 30 and the reflecting film 32 are formed on a surface of the plate-shaped block 13a on a side of the slope 13d or a surface of the plate-shaped block 13b on a side of the slope 13d. Then, the block 13a and the block 13b are bonded to each other with an adhesive. The adhesive is an ultraviolet curable adhesive, a heat curable adhesive, or an anaerobic adhesive, for example.

In this way, one large block in which the plate-shaped block 13a, the plate-shaped block 13b, and the plate-shaped block 13c are bonded is formed. Then, the large block is cut in a predetermined shape and polished to thereby manufacture the integrated prism 13. Anti-reflection films may be formed on the side surfaces 13f, 13g, and 13h, which are surfaces through which a laser beam is incident or emitted, among surfaces of the integrated prism 13.

A method of manufacturing the astigmatism-generating element 31 in FIG. 8C is as follows. First, the resin 41 is coated on a surface of the plate-shaped block 13b and is then cured. Then, an irregular pattern having a predetermined shape is left in the resin 41 by performing development by irradiation of ultraviolet rays and exposure through the gray scale mask by which a predetermined irregular pattern of the ring band 31c and the level difference 31b can be formed. Then, an irregular pattern having a predetermined shape is formed on a surface of the block 13b by etching. At this time, since the resin 41 is completely etched, the resin 41 does not remain. This irregular pattern becomes a reflecting surface shape of the Fresnel mirror 31a. In this manner, the irregular pattern, which has a predetermined shape, of the ring bands 31c and the level difference 31b of the astigmatism-generating element 31 is formed on the surface of the block 13b. Then, the reflecting film 42 is formed and then an absorption film is formed on the surface. Finally, the block 13b and the block 13c are bonded to each other with the adhesive 43. Since a laser beam does not pass through the adhesive 43, the adhesive 43 does not need to be transparent for a laser beam or to have almost the same refractive index as a material used to form the block 13b.

A method of manufacturing the astigmatism-generating element 31 shown in FIG. 8D is as follows. First, the resin 41 is coated on a surface of the plate-shaped block 13c and is then cured. Then, an irregular pattern having a predetermined shape is left in the resin 41 by performing development by irradiation of ultraviolet rays and exposure through the gray scale mask by which a predetermined irregular pattern of the ring band 31c and the level difference 31b can be formed. Then, an irregular pattern having a predetermined shape is formed on a surface of the block 13c by etching. At this time, since the resin 41 is completely etched, the resin 41 does not remain. This irregular pattern becomes a reflecting surface shape of the Fresnel mirror 31a. In this manner, the irregular pattern, which has a predetermined shape, of the ring bands 31c and the level difference 31b of the astigmatism-generating element 31 is formed on the surface of the block 13c. Then, an absorption film is formed and then the reflecting film 42 is formed on the surface. Finally, the block 13b and the block 13c are bonded to each other with the adhesive 43. Preferably, the adhesive 43 is transparent for laser beams with the wavelengths $\lambda 1$ and $\lambda 2$ and has almost the same refractive index as a material used to form the block 13b.

A method of manufacturing the astigmatism-generating element 31 shown in FIG. 8E is as follows. First, the resin 41 is coated on a surface of the plate-shaped block 13b and is then cured. Then, an irregular pattern having a predetermined shape is left in the resin 41 by performing development by irradiation of ultraviolet rays and exposure through the gray scale mask by which a predetermined irregular pattern of the ring band 31c and the level difference 31b can be formed. This irregular pattern becomes a reflecting surface shape of the Fresnel mirror 31a. Then, the reflecting film 42 is formed and then an absorption film is formed on the surface. Finally, the block 13b and the block 13c are bonded to each other with the adhesive 43. Preferably, the adhesive 41 is transparent for laser beams with the wavelengths $\lambda 1$ and $\lambda 2$ and has almost the same refractive index as a material used to form the block 13b. However, since a laser beam does not pass through the adhesive 43, the adhesive 43 does not need to be transparent for a laser beam or to have almost the same refractive index as a material used to form the block 13b.

In the cases shown in FIGS. 8B and 8E, the precision of the level difference 31b and the shape of the ring band 31c can be improved for as much as the resin 41 is not etched, compared with the cases shown in FIGS. 8C and 8D. In addition, the astigmatism-generating element 31 can be manufactured as cheap as the etching process is omitted.

In addition, the resin 41 that is a photosensitive resin for lithography is not necessarily waterproof. For example, when the moisture permeates, an optical property changes and accordingly, a refractive index changes or adhesion between the block 13b and the block 13c becomes weak and accordingly, the block 13b and the block 13c easily peel off from each other. As a result, the reliability lowers. In the first embodiment, the resin 41 is disposed so as not to be exposed to the outside of the integrated prism 13 as shown in FIGS. 8B and 8E. In addition, the resin 41 is covered with the reflecting film 42. Accordingly, it is possible to prevent the moisture from permeating the resin 41 directly from the outside. As a result, high reliability of the resin 41 can be maintained.

Figure 9A:
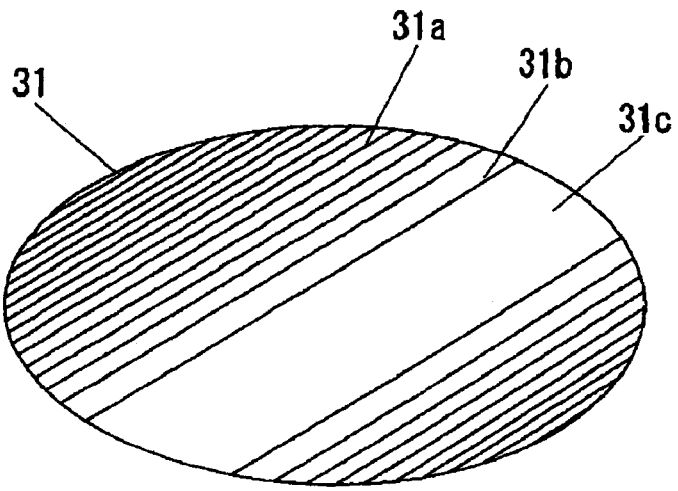
FIG. 9A is a view illustrating a first example of a level difference pattern of the astigmatism-generating element in the first embodiment.
Figure 9B:
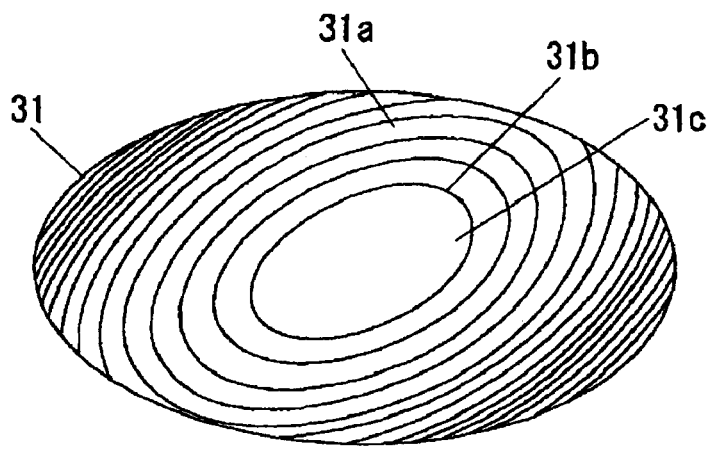
FIG. 9B is a view illustrating a second example of the level difference pattern of the astigmatism-generating element in the first embodiment.
Figure 9C:
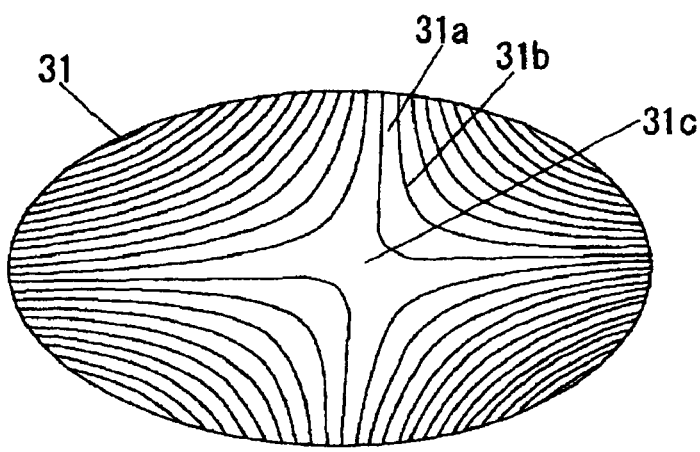
FIG. 9C is a view illustrating a third example of the level difference pattern of the astigmatism-generating element in the first embodiment.

FIG. 9A is a view illustrating a first example of the level difference pattern of the astigmatism-generating element in the first embodiment, FIG. 9B is a view illustrating a second example of the level difference pattern of the astigmatism-generating element in the first embodiment, and FIG. 9C is a view illustrating a third example of the level difference pattern of the astigmatism-generating element in the first embodiment. The longitudinal direction of the astigmatism-generating element 31 is a direction along the slope 13e. In addition, the reason why the level difference pattern appears to be inclined is because two perpendicular cross sections including an optical axis are inclined by 45° on the optical receiver 18. A line portion shown in FIGS. 9A, 9B, and 9C is the level difference 31b, and a portion between line portions is the ring band 31c.

The level difference pattern shown in FIG. 9A indicates that the astigmatism-generating element 31 is the Fresnel mirror 31a equivalent to a three-dimensional curved mirror having a cylindrical shape or a columnar shape. The level difference pattern shown in FIG. 9B indicates that the astigmatism-generating element 31 is the Fresnel mirror 31a equivalent to a curved mirror that is a concave mirror or a convex mirror having different radii of curvature at two perpendicular axes. The level difference pattern shown in FIG. 9C indicates that the astigmatism-generating element 31 is the Fresnel mirror 31a equivalent to a curved mirror in which one side is a concave mirror or the other side is a convex mirror at two perpendicular axes. Thus, the level difference pattern of the astigmatism-generating element 31 changes with the shape of the three-dimensional curved mirror.

As described above, the optical pickup device 10 according to the first embodiment includes the light source 11, the optical receiver 18, and the astigmatism-generating element 31. The light source 11 emits a laser beam toward the optical disk 25. The optical receiver 18 detects light reflected from the optical disk 25. The astigmatism-generating element 31 generates light used for focus control in a condition where a focusing position on one of the two perpendicular cross sections including an optical axis of the reflected light of the optical disk 25 is located ahead of the optical receiver 18 and a focusing position on the other cross section is located behind the optical receiver 18. The optical pickup device 10 is the Fresnel mirror 31a in which the astigmatism-generating element 31 is formed by a plurality of orbicular band shaped reflecting mirrors and is characterized in that the imaginary surface 31d, which connects the tips of the orbicular band shaped reflecting mirrors, is curved in the concave shape toward the light incidence side.

In the optical pickup device 10 according to the first embodiment, the imaginary surface 31d is curved in the concave shape toward the light incidence side, incident light is incident on the Fresnel mirror 31a earlier at the outer periphery than in a case in which the imaginary surface 31d has a completely flat shape. Accordingly, since a situation of the phase in the level difference 31b of the orbicular band shaped reflecting mirrors adjacent to each other changes and a component of diffracted light caused by the level difference 31b is reduced, stray light on the optical receiver 18 can be suppressed. As a result, the tracking control or the focus control is stabilized. In addition, since the Fresnel mirror 31a is used as the astigmatism-generating element 31, miniaturization can be realized. Accordingly, miniaturization and stabilized recording and reproduction are possible.

(Second Embodiment)

Figure 10:
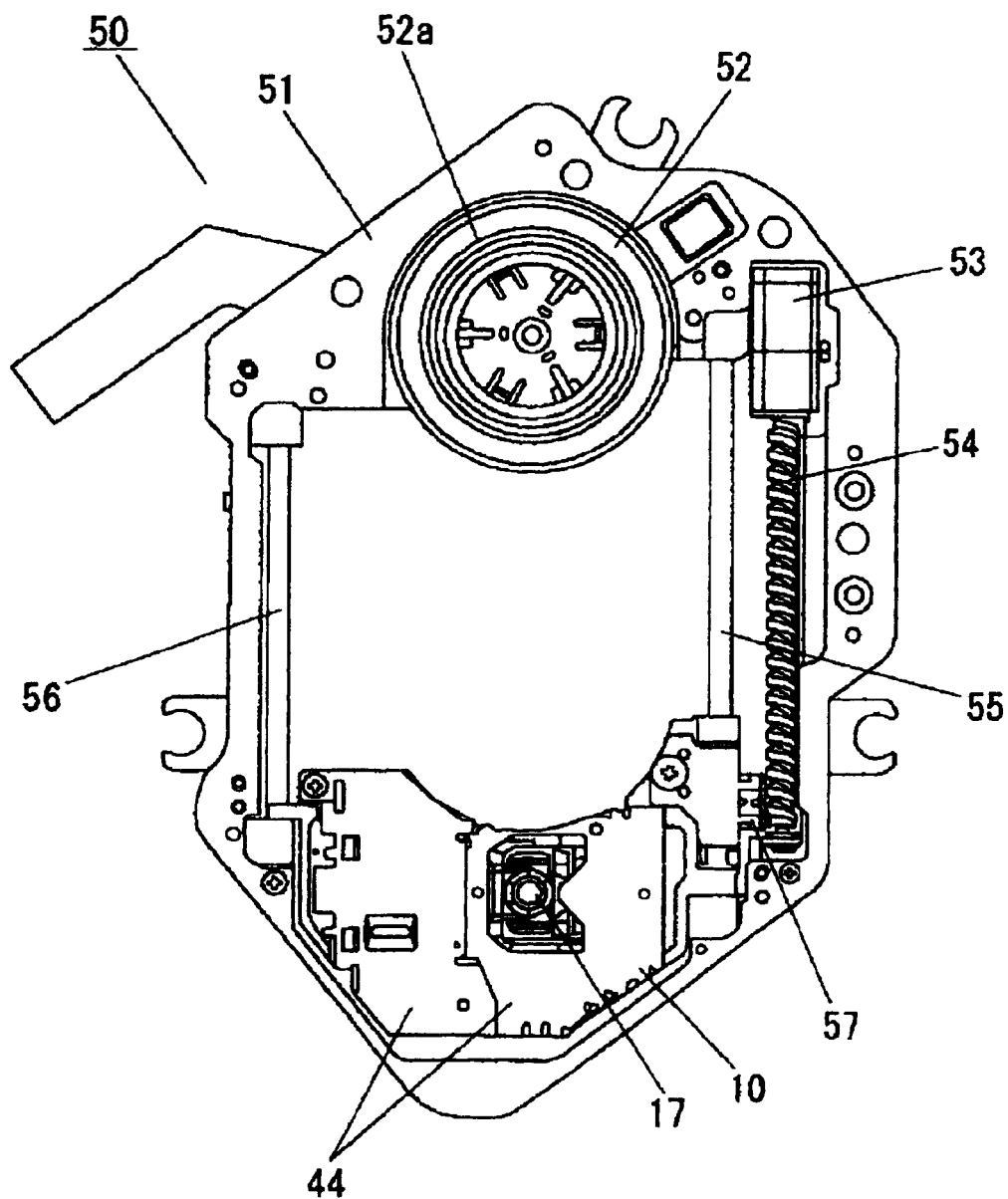
FIG. 10 is a view illustrating the configuration of an optical pickup module according to a second embodiment.
Figure 11:
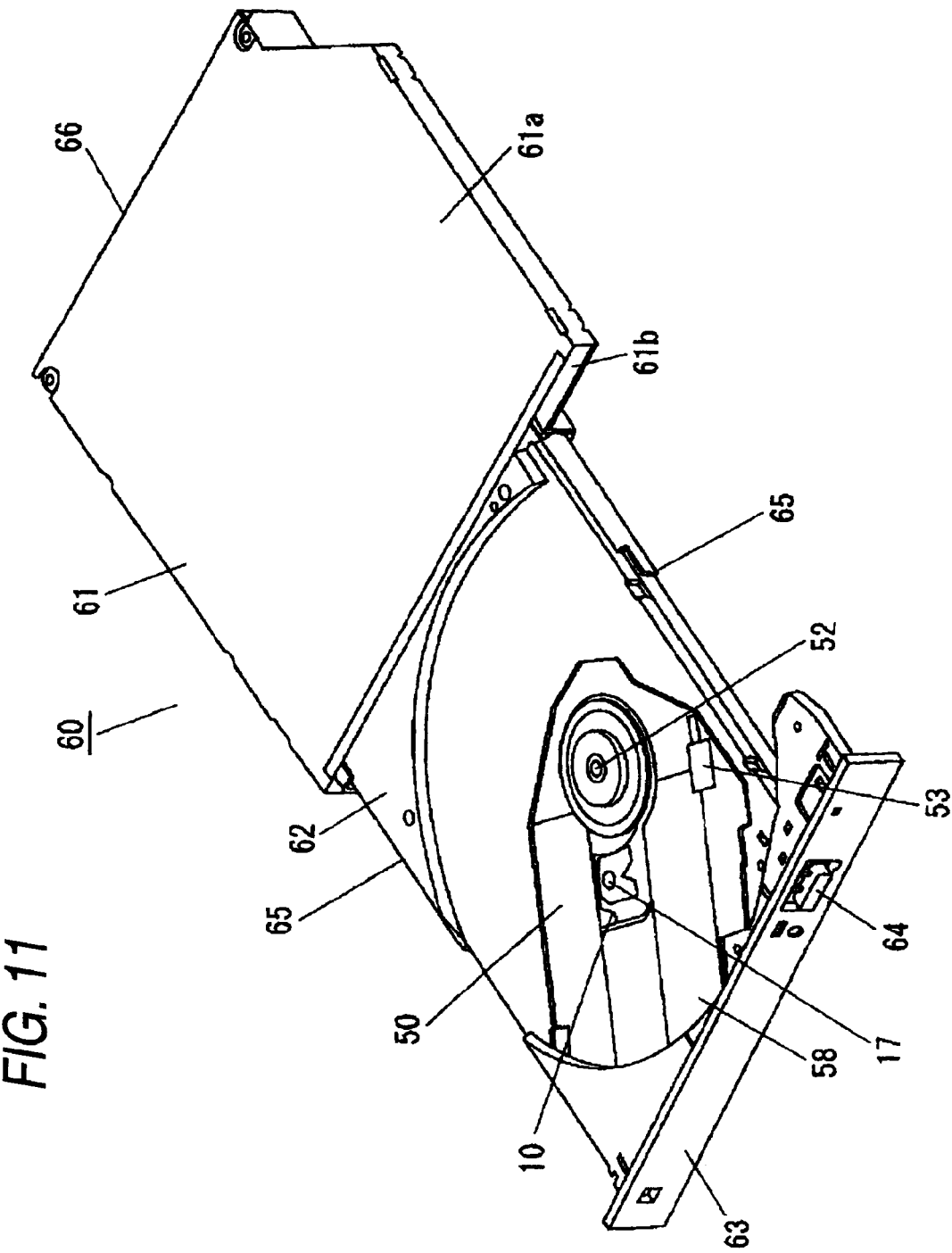
FIG. 11 is a view illustrating the configuration of an optical pickup device according to the second embodiment.

A second embodiment will be described with reference to the accompanying drawings. FIG. 10 is a view illustrating the configuration of an optical pickup module according to the second embodiment, and FIG. 11 is a view illustrating the configuration of an optical pickup device according to the second embodiment.

In FIG. 10, a driving mechanism of an optical disk device 60, which has a rotation-driving portion for performing rotation driving of the optical disk 25 and a moving portion serving to make the optical pickup device 10 close to or far from the rotation-driving portion, is referred to as an optical pickup module 50. Since a base 51 forms a skeleton of the optical pickup module 50, the optical pickup module 50 is configured such that respective constituent components are arranged directly or indirectly on the base 51.

The rotation-driving portion includes a spindle motor 52 having a turntable 52a on which the optical disk 25 is placed. The spindle motor 52 is fixed to the base 51. The spindle motor 52 generates a rotational driving force to rotate the optical disk 25.

The moving portion includes a feed motor 53, a screw shaft 54, a main shaft 55, and a subshaft 56. The feed motor 53 is fixed to the base 51. The feed motor 53 generates a rotational driving force required when the optical pickup device 10 moves between the inner periphery and outer periphery of the optical disk 25. For example, a stepping motor or a DC motor is used as the feed motor 53. The screw shaft 54 is spirally grooved and is directly connected to the feed motor 53 or connected to the feed motor 53 through several stages of gears. In the second embodiment, the screw shaft 54 is directly connected to the feed motor 53. Each of the main shaft 55 and the subshaft 56 has both ends that are fixed to the base 51 through a supporting member. The main shaft 55 and the subshaft 56 movably support the optical pickup device 10 in the radial direction of the optical disk 25. The optical pickup device 10 includes a rack 57 having guide teeth which engage grooves of the screw shaft 54. Since the rack 57 converts the rotational driving force of the feed motor 53 transmitted to the screw shaft 54 into a linear driving force, the optical pickup device 10 can move between the inner periphery and outer periphery of the optical disk 25.

In addition, the rotation-driving portion is not limited to having the configuration described in the second embodiment as long as it can rotate the optical disk 25 at a predetermined number of rotations. In addition, the moving portion is not limited to having the configuration described in the second embodiment as long as it can move the optical pickup device 10 to a predetermined position between the inner periphery and outer periphery of the optical disk 25.

The optical pickup device 10 is obtained by attaching a cover 44 in the configuration shown in FIG. 2. The optical pickup device 10 includes the light source 11, the optical receiver 18, and the astigmatism-generating element 31. The light source 11 emits a laser beam toward the optical disk 25. The optical receiver 18 detects light reflected from the optical disk 25. The astigmatism-generating element 31 generates light used for focus control in a condition where a focusing position on one of the two perpendicular cross sections including the optical axis of the reflected light of the optical disk 25 is located ahead of the optical receiver 18 and a focusing position on the other cross section is located behind the optical receiver 18. The optical pickup device 10 is the Fresnel mirror 31a in which the astigmatism-generating element 31 is formed by a plurality of orbicular band shaped reflecting mirrors and is characterized in that the imaginary surface 31d, which connects the tips of the orbicular band shaped reflecting mirrors, is curved in the concave shape toward the light incidence side.

In the optical pickup device 10 according to the second embodiment, because the imaginary surface 31d is curved in the concave shape with respect to the light incidence side, incident light is incident on the Fresnel mirror 31a earlier at the outer periphery in comparison to a case where the imaginary surface 31d has a completely flat shape. Accordingly, since a situation of the phase in the level difference 31b of the orbicular band shaped reflecting mirrors adjacent to each other changes and a component of diffracted light caused by the level difference 31b is reduced, stray light on the optical receiver 18 can be suppressed. As a result, the tracking control or the focus control is stabilized. In addition, since the Fresnel mirror 31a is used as the astigmatism-generating element 31, miniaturization can be realized. Accordingly, miniaturization and stabilized recording and reproduction are possible.

An adjusting mechanism that forms a supporting member adjusts the inclination of the main shaft 55 and subshaft 56 so that a laser beam emitted from the objective lens 17 of the optical pickup device 10 is incident on the optical disk 25 at a right angle.

Referring to FIG. 11, a housing 61 of the optical disk device 60 is formed by combining an upper housing 61a and a lower housing 61b and fixing them to each other with screws or the like. A tray 62 is retractably provided with respect to the housing 61. In the tray 62, the optical pickup module 50 provided with a cover 58 is disposed from a bottom surface of the tray. The cover 58 has an opening that exposes the objective lens 17 of the optical pickup device 10 and the turntable 52a of the spindle motor 52. Furthermore, in the second embodiment, the feed motor 53 is also exposed such that the thickness of the optical pickup module 50 becomes small. The tray 62 has an opening that exposes the objective lens 17, the turntable 52a, and at least a part of the cover 58. A bezel 63 is provided on a front surface of the tray 62 and is adapted to block the entrance of the tray 62 when the tray 62 is accommodated within the housing 61. The bezel 63 is provided with an eject switch 64. By pushing the eject switch 64, engagement between the housing 61 and the tray 62 is released, which makes it possible for the tray 62 to appear from the housing 61. Rails 65 are slidably attached to both opposite sides of the tray 62 and the housing 61. A circuit board (not shown) is provided inside the housing 61 or the tray 62. A power supply circuit, ICs for signal processing system, and the like are mounted on the circuit board. An external connector 66 is connected to a power supply/signal line provided in an electronic apparatus, such as a computer. In addition, by way of the external connector 66, power is supplied to the optical disk device 60, an electrical signal from the outside is led into the optical disk device 60, or an electrical signal generated in the optical disk device 60 is transmitted to an electronic apparatus.

Figure 12:
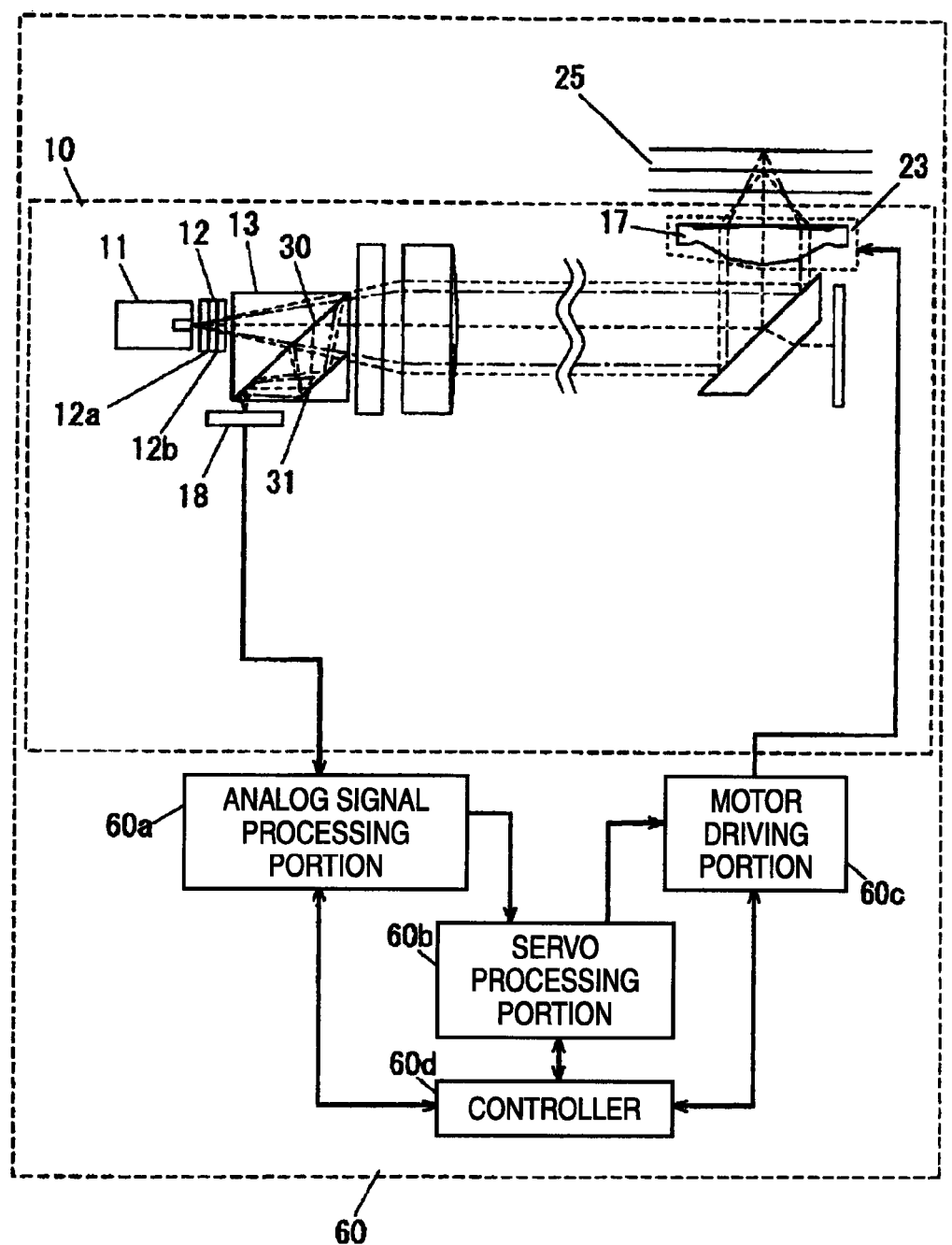
FIG. 12 is a view illustrating the flow of a servo control of the optical pickup device according to the second embodiment.
Figure 13:
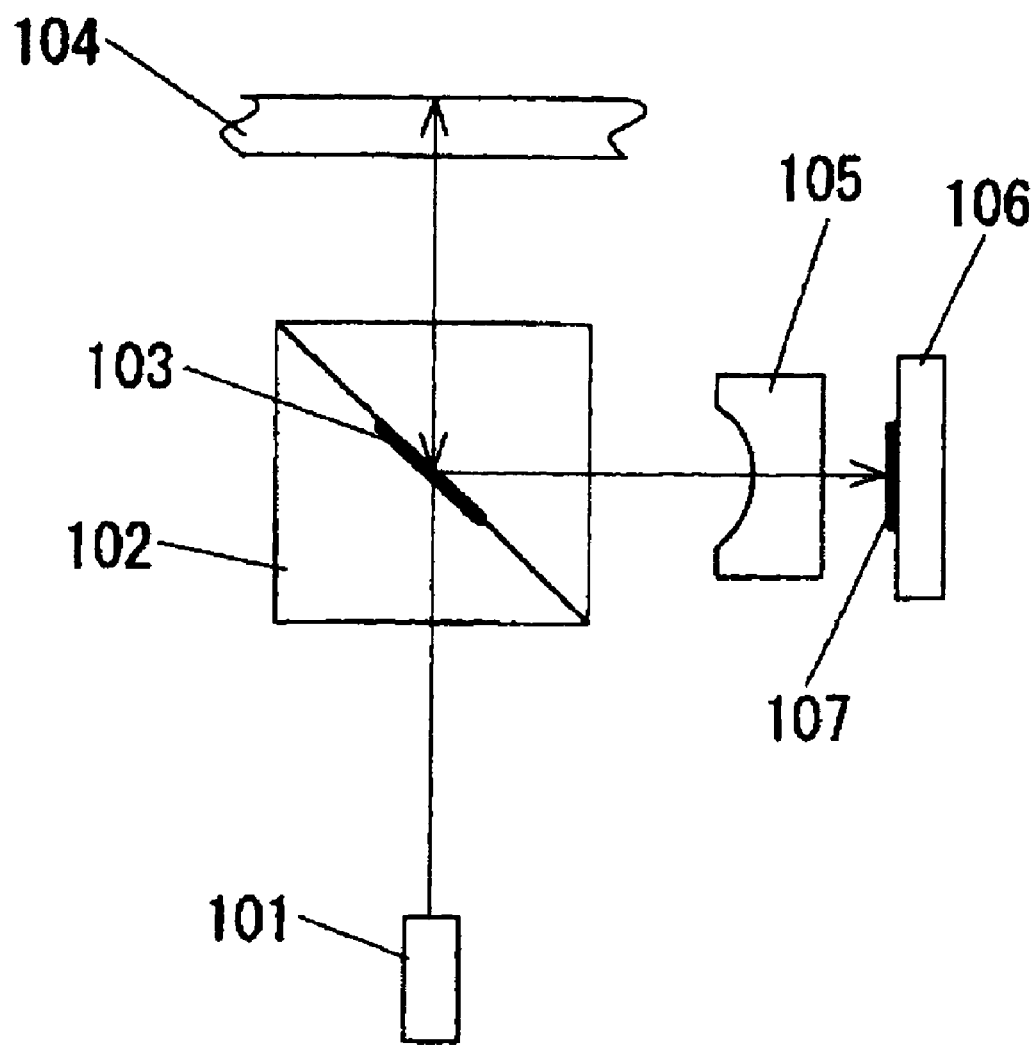
FIG. 13 is a view illustrating the configuration of main parts in an optical system of a known optical pickup device.
Figure 14A:
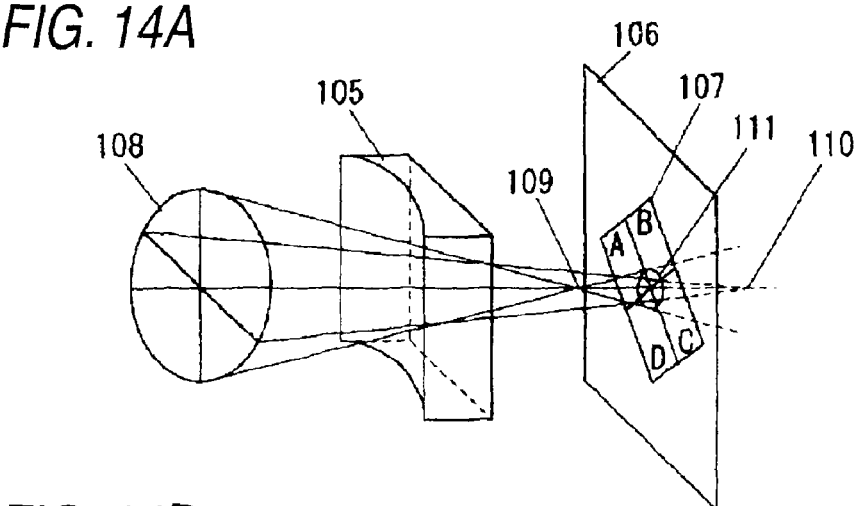
FIG. 14A is an explanatory view illustrating a known detection lens.
Figure 14B:
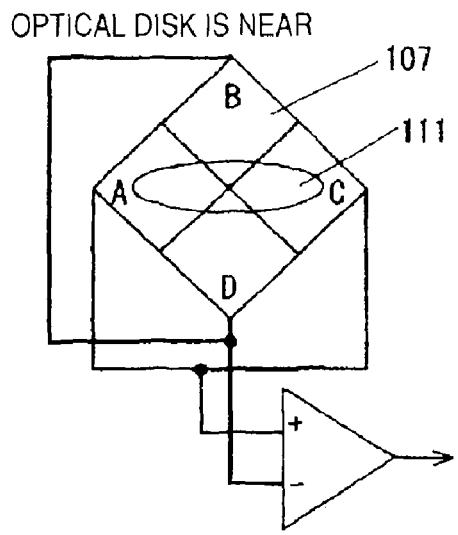
FIG. 14B is a view illustrating a state of a spot when an optical disk is near.
Figure 14C:
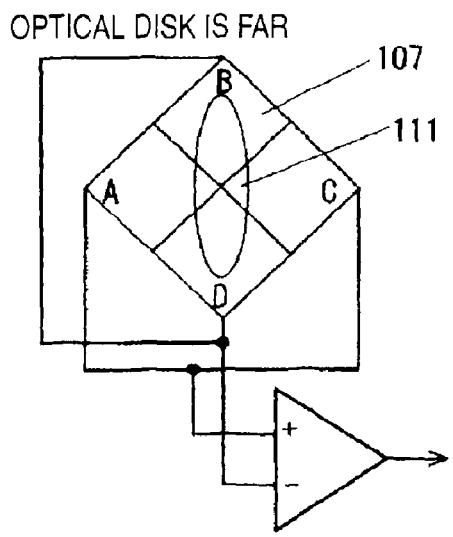
FIG. 14C is a view illustrating a state of a spot when an optical disk is far.
Figure 15A:
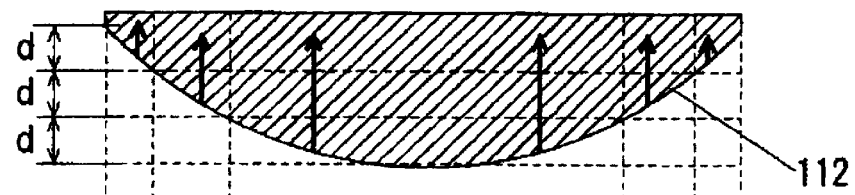
FIG. 15A is a cross-sectional view illustrating a normal lens.
Figure 15B:
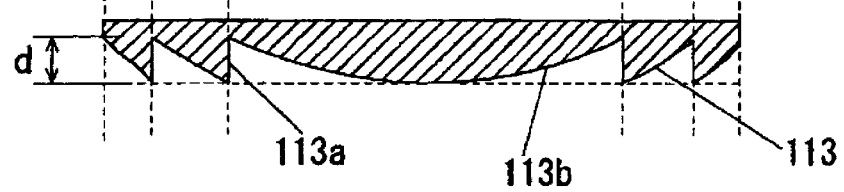
FIG. 15B is a cross-sectional view illustrating a Fresnel lens.

FIG. 12 is a view illustrating the flow of a servo control of the optical pickup device according to the second embodiment. The flow of the focus control and tracking control of the optical pickup device 10 will be described. A laser beam for DVD having the wavelength $\lambda 1$ and a laser beam for CD having the wavelength $\lambda 2$, which are emitted from the light source 11, are separated into light beams used for the tracking control by the first diffraction grating 12a and the second diffraction grating 12b of the diffraction element 12 and are then incident on the optical disk 25. Laser beams reflected from the optical disk 25 are separated by the beam splitter 30 of the integrated prism 13, become laser beams having different focal distances on two perpendicular cross sections including an optical axis by the astigmatism-generating element 31, and are then incident on the optical receiver 18. The laser beams transmitted through the astigmatism-generating element 31 are used for focus control. The laser beams incident on the optical receiver 18 are converted into an electric signal for focus control in DVD, an electric signal for focus control in CD, an electric signal for tracking control in DVD, and an electric signal for tracking control in CD and are then transmitted to an analog signal processing portion 60a provided on the circuit board (not shown) of the main body of the optical disk device 60.

The analog signal processing portion 60a performs operation and band processing on input signals and outputs the processed signals to a servo processing portion 60b. The servo processing portion 60b generates the focus error signal FES and the tracking error signal TES on the basis of the signals from the analog signal processing portion 60a and outputs the signals to a motor driving portion 60c. Generally, the analog signal processing portion 60a generates signals representative of parameters associated with the light generated by the astigmatism-generating element. The servo processing portion 60b generates focus control signals and error control signals based upon the signals generated by the signal processing portion 60a. The motor driving portion 60c generates a current for driving the actuator 23 in which the objective lens 17 is mounted on the basis of the focus error signal FES and the tracking error signal TES that have been input. As a result, a control is made such that deviation of a focal point of beams condensed on the optical disk 25 and deviation from a track are minimized.

In addition, signals transmitted from the analog signal processing portion 60a, the servo processing portion 60b, and the motor driving portion 60c are input to a controller 60d. The controller 60d controls each of the portions by performing operation processing on the signals, transmitting a result (signal) of the operation processing to each portion, and making each portion execute driving and processing.

As described above, the optical disk device 60 according to the second embodiment includes the optical pickup device 10 according to the first embodiment. Since the imaginary surface 31d is curved in the concave shape toward the light incidence side, incident light is incident on the Fresnel mirror 31a earlier as much as the outer periphery, compared with a case where the imaginary surface 31d has a completely flat shape. Accordingly, since a situation of the phase in the level difference 31b of the orbicular band shaped reflecting mirrors adjacent to each other changes and a component of diffracted light caused by the level difference 31b is reduced, stray light on the optical receiver 18 can be suppressed. As a result, the tracking control or the focus control is stabilized. In addition, since the Fresnel mirror 31a is used as the astigmatism-generating element 31, miniaturization can be realized. Accordingly, miniaturization and stabilized recording and reproduction are possible.

This application based upon and claims the benefit of priority of Japanese Patent Application No 2007-205290 filed on Aug. 7, 2007 the contents of which are incorporated herein by reference in its entirety.

What is claimed is:

1. An optical pickup device, comprising:
a light source which emits a laser beam toward an optical disk;
an optical receiver which detects light reflected from the optical disk; and
an astigmatism-generating element which generates light used for focus control in a condition that a focusing position on one of two perpendicular cross sections including an optical axis of the light reflected from the optical disk is located ahead of the optical receiver and a focusing position on the other cross section is located behind the optical receiver;
wherein the astigmatism-generating element is a Fresnel mirror configured to have a plurality of orbicular band shaped reflecting mirrors, and an imaginary surface that connects tips of the orbicular band shaped reflecting mirrors is curved in a concave shape toward a light incidence side,
the light source emits laser beams with two wavelengths from adjacent positions, and the laser beam with one of the wavelengths is emitted toward a DVD and the laser beam with the other wavelength is emitted toward a CD, and
a level difference of the orbicular band shaped adjacent reflecting mirrors in a central portion of the Fresnel mirror has a depth almost equal to a half wavelength of reflected light from the CD.

2. An optical disk device comprising:
a light source which emits a laser beam toward an optical disk;
an optical receiver which detects light reflected from the optical disk;
an astigmatism-generating element which generates light used for focus control in a condition that a focusing position on one of two perpendicular cross sections including an optical axis of the light reflected from the optical disk is located ahead of the optical receiver and a focusing position on the other cross section is located behind the optical receiver;
a signal processing portion for generating signals representative of parameters associated with the light generated by the astigmatism-generating element; and
a servo processing portion for generating focus control signals and error control signals based upon the signals generated by the signal processing portion,
wherein the astigmatism-generating element is a Fresnel mirror configured to have a plurality of reflecting mirrors,
an imaginary surface that connects tips of the reflecting mirrors is curved in a concave shape toward a light incidence side,
the light source emits laser beams with two wavelengths from adjacent positions, and the laser beam with one of the wavelengths is emitted toward a DVD and the laser beam with the other wavelength is emitted toward a CD, and
a level difference of the reflecting mirrors in a central portion of the Fresnel mirror has a depth almost equal to a half wavelength of reflected light from the CD.

3. A Fresnel mirror for an optical pickup device, the Fresnel mirror configured to receive from an optical disk first and second reflected light at adjacent positions, the first reflected light having a first wavelength and the second reflected light having a second wavelength that is longer than the first wavelength, the Fresnel mirror comprising:
a plurality of reflecting mirrors disposed so that tip portions of the reflecting mirrors are offset from each other in a concave-shaped pattern toward a light reception side, wherein the Fresnel mirror generates light having first and second focal positions on first and second perpendicular cross sections along an optical axis of the light reflected from the optical disk,
wherein a level difference between adjacent reflecting mirrors in a central portion of the Fresnel mirror has a depth almost equal to a half wavelength of reflected light from the CD.

* * * * *